A. C. LINDGREN.
WHEELED CULTIVATOR.
APPLICATION FILED JULY 9, 1909.
970,514.
Patented Sept. 20, 1910.
4 SHEETS—SHEET 1.
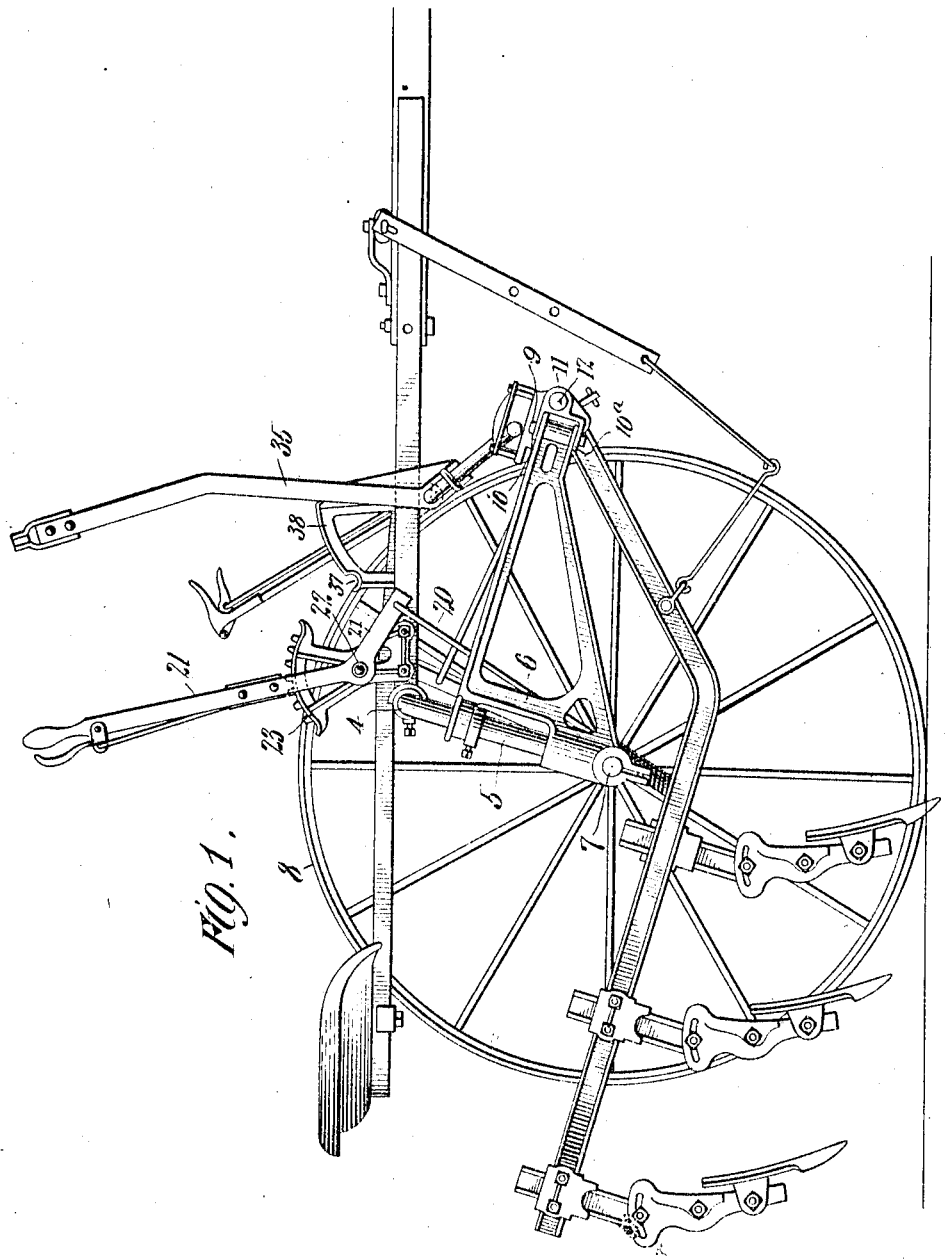

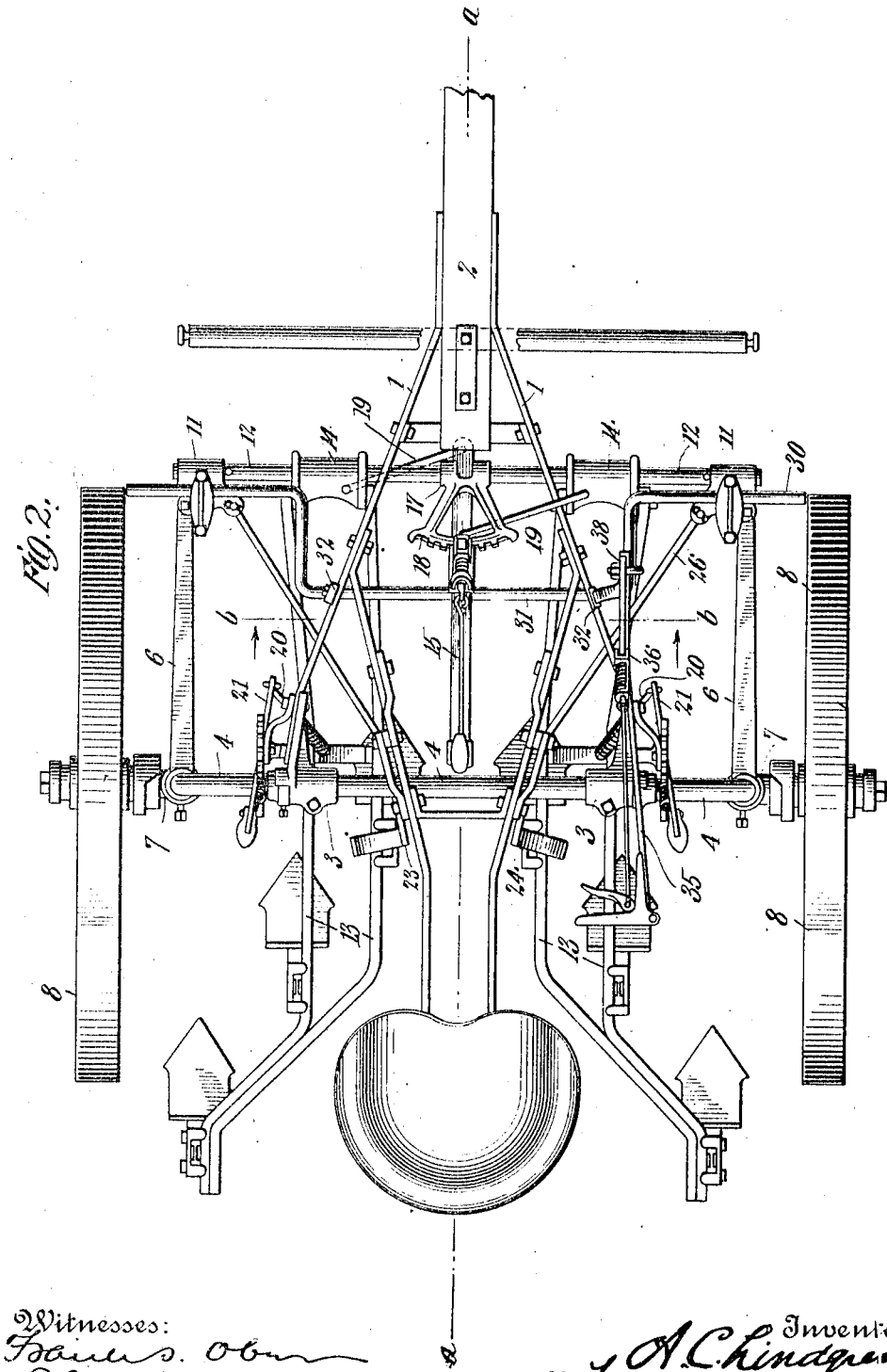

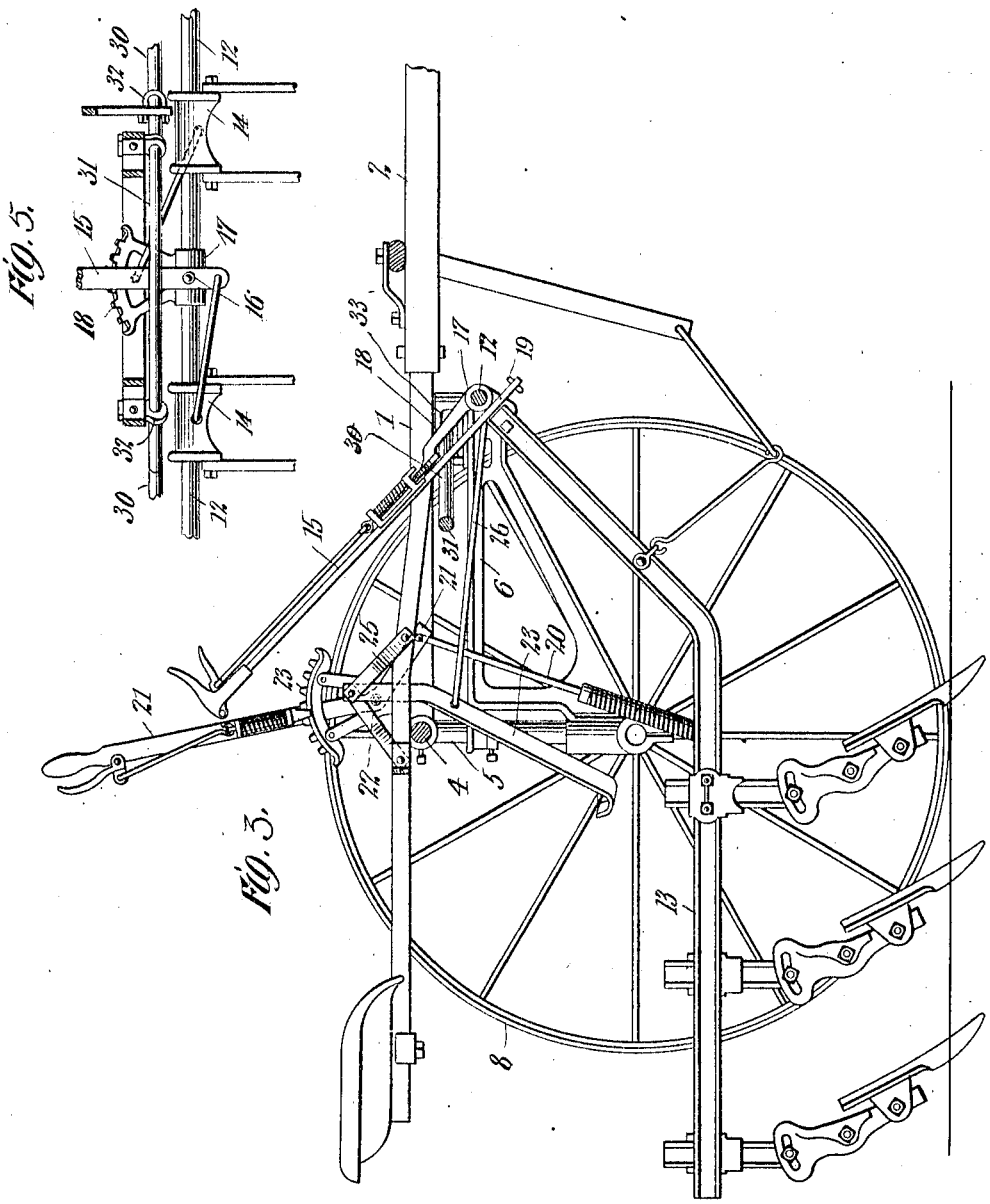

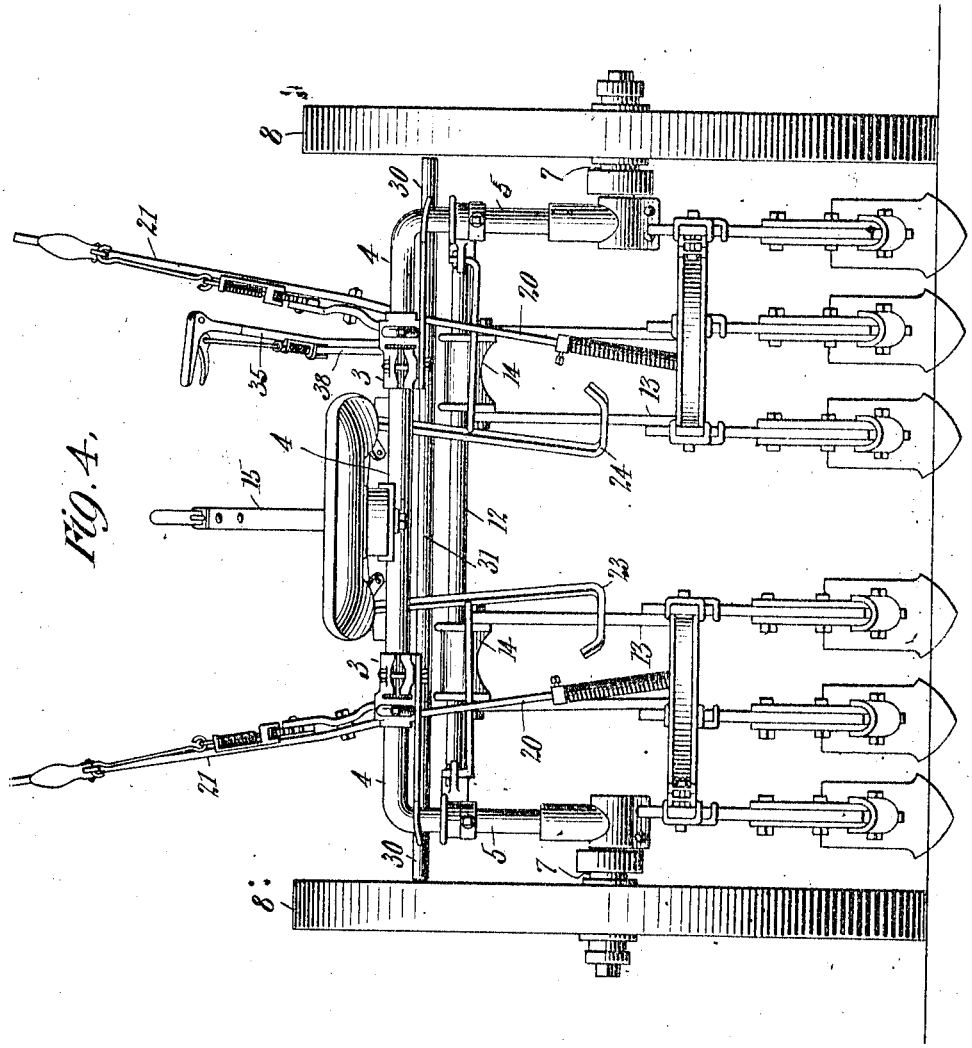

UNITED STATES PATENT OFFICE.

ALEXUS C. LINDGREN, OF MOLINE, ILLINOIS, ASSIGNOR TO MOLINE PLOW COMPANY, A CORPORATION OF ILLINOIS.

WHEELED CULTIVATOR.

970,514.  Specification of Letters Patent.  Patented Sept. 20, 1910.

Application filed July 9, 1909. Serial No. 506,697.

*To all whom it may concern:*

Be it known that I, ALEXUS C. LINDGREN, of Moline, county of Rock Island, and State of Illinois, have invented a new and useful Improvement in Wheeled Cultivators, of which the following is a specification.

This invention relates to wheeled cultivators of the type in which means are provided for balancing the weight of the cultivator drag bars when they are elevated, by a movement of the ground wheels rearwardly with reference to the frame, the purpose being to avoid the objectionable neck weight on the draft animals when the drag bars are raised at the ends of rows, etc.

The invention consists primarily of improved mechanism, acting when the drag bars are elevated to raise the cultivating tools out of the ground, to simultaneously move the ground wheels rearwardly so as to counteract the weight of the same.

The invention consists also in improved means for effecting the lateral or sidewise movements of the drag bars, which means are under the control of the driver's feet, so that the cultivating tools may be made to follow the deviations in crooked rows.

The invention consists also in improved means for turning the ground wheels around vertical axes as the drag bars are shifted laterally, so that the machine in its movements will follow the deviations in the rows.

The invention consists also in the details of construction and combination of parts hereinafter described and claimed.

In the accompanying drawings:—Figure 1 is a side elevation of my improved machine showing the drag bars raised and the ground wheels shifted rearwardly to balance the frame. Fig. 2 is a top plan view of the machine. Fig. 3 is a longitudinal sectional elevation on the line $a$—$a$ of Fig. 2. Fig. 4 is a rear elevation of the machine. Fig. 5 is a transverse sectional elevation on the line $b$— , of Fig. 3.

Referring to the drawings:—The frame of the machine comprises two horizontal frame bars 1, connected at their forward ends to a tongue 2, and at their rear ends to castings or sleeves 3. Within the sleeves is loosely mounted, so as to rock therein, an arched axle-member 4, the vertical limbs 5 of which extend loosely in vertical alining sockets in the rear ends of wheel carrying brackets 6. These brackets are provided at their lower ends with wheel spindles 7, on which are mounted ground wheels 8, the construction being such that by the lateral movements of the forward ends of the brackets, the wheels will be turned on vertical axes for the purposes to be presently described.

At their forward ends the brackets are pivoted, by means of vertical pivot-bolts 9, between rearwardly extending arms 10 and $10^a$ on frames 11, one for each bracket, which frames are connected together by means of a horizontal cross-bar 12 fixed thereto. As a result of this construction, the cross-bar may be shifted transversely, the frames 11 pivoting on the bolts 9, and the brackets 6 pivoting on the vertical ends of the axle-member, under which conditions the two brackets will form a parallel motion between the axle and cross-bar, which latter will be maintained at all times at right angles to the line of draft.

13, 13 represent drag bars, there being two in the present instance, each connected at its forward end to a head 14 mounted loosely on the cross-bar, in such manner that the heads may be moved endwise thereon to vary the distance between the drag bars. In order to thus adjust the drag bars laterally and hold them in their adjusted positions, I provide a hand lever 15, as shown more particularly in Fig. 7, which is pivoted on an upright axis, as at 16, to a sleeve 17 loosely encircling the cross-bar 12 and provided with a toothed segment frame 18, engaged by a locking dog carried by the lever. On the opposite sides of its axis, the lever is connected to the heads 14 respectively by means of links 19, so that by the movements of the lever, the heads will be shifted in opposite directions and the drag bars thus adjusted to and from each other, they being held in their adjusted positions by means of the locking dog on the lever engaging the toothed segment frame.

The drag bars are suspended at a point in rear of their connection with the cross-bar, by means of links 20, the lower ends of which are passed loosely through the drag bars and are provided on their ends with heads engaging the undersides of the bars, spiral springs being applied to the links above the drag bars and acting to exert a downward yielding pressure thereon. At their upper ends the links are connected with the lower ends of hand levers 21, pivoted, as at 22, to segment frames 23 fixed respectively to the frame bars 1, 1, the said levers being provided as usual with locking dogs engaging the teeth on the segment frames. By means of these levers the drag bars may be independently raised and lowered and adjusted vertically to control the depth of cut.

The movements of the cross-bar 12 laterally to correspondingly shift the drag bars to follow the rows of plants, is effected by means of two pendent foot levers 23 and 24, pivoted at their upper ends on horizontal oblique axes between the upper ends of two straps 25, fixed at their lower ends to the frame bars, as shown particularly in Fig. 4. Between their ends the pendent levers are connected by means of outwardly and forwardly extending links 26 respectively with the frames 11 on the ends of the cross-bar 12, as a result of which construction the movements of the foot levers by the feet of the driver outwardly and forwardly, will correspondingly shift the cross-bar 12 endwise, which action will correspondingly shift the two drag bars transversely, and owing to the connection of the cross-bar with the brackets 6, will swivel the latter on the vertical limbs of the axle-member and turn the wheels to the right or left, as the case may be.

The cross-bar 12, carrying the drag bars at their forward ends, is maintained normally in the elevated position shown in Fig. 1, by means of crank arms 30, on a rock shaft 31, mounted in bearings 32 on the frame, the said crank arms extending outwardly and horizontally through fore and aft slots 33 in the frames 11 respectively. In the elevated position of the cross-bar, as shown in Fig. 1, the two brackets 6 will extend horizontally forward and will maintain the arched axle 4 with its end limbs extending vertically. By rocking the shaft 31 forwardly, the crank arms thereon will be swung downwardly, as shown in Fig. 2, and engaging in the slots in the frames 11, the latter and the cross-bar 12 carried thereby, will be depressed, which action will depress the forward ends of the brackets 6 and cause the vertical limbs of the arched axle to move rearwardly, thereby correspondingly shifting the ground wheels rearwardly with reference to the frame. As the cross-bar is by this action depressed, the forward ends of the drag bars will be carried downward with it, and the rear ends will be raised, the drag bars fulcruming in this movement on the points where the suspending links 20 engage therewith. The rocking motion of the shaft 31 is effected by means of a hand lever 35 connected to one of the crank arms of the shaft and provided with a locking dog 36 adapted to engage either of two notches 37 in a segment frame 38 fixed to the frame of the machine, from which construction the cross-bar may be locked in its elevated position, as shown in Fig. 1, or in its lowered depressed position, as shown in Fig. 2. It will be observed that in the elevating movement of the drag bars in unison, when the support at their forward ends is depressed, the drag bars move on fulcrums about midway between their ends, as represented by the points of connection of the suspending links with the drag bars. As a result, the hoes or cultivating tools in entering the ground move in arcs of shorter radii than if the drag bars were pivoted at their forward ends, and consequently the tools will enter the ground more readily.

It is seen, therefore, that the drag bars may be raised in unison by the forward motion of hand lever 35, and that this action will shift the ground wheels rearwardly with reference to the frame, with the result that the weight of the drag bars will be counteracted and the draft animals will thus be relieved of the objectionable neck weight of the tongue, which would otherwise be present.

While in the accompanying drawings I have illustrated the details of the mechanism which in actual practice has been found to answer satisfactorily the objects and ends to be attained, I wish to be understood that the invention is not limited to any particular form or arrangement of the parts except so far as such limitations are specified in the claims.

Having thus described my invention, what I claim is:—

1. In a cultivator, the combination of a main frame, brackets pivotally mounted on the main frame on a horizontal axis and extending forwardly, a drag bar support carried by the brackets in advance of their pivotal axes and movable bodily with said brackets in their pivotal motions, drag bars mounted on said support and extending rearwardly, ground wheel spindles carried by the brackets in rear of the drag bar support and below the pivotal axes of the brackets, and means for rocking the brackets on their axes; whereby the said spindles and the said drag bar support will be caused to move about a common axis.

2. In a cultivator, the combination of a main frame, ground wheel spindles movable rearwardly with reference to the frame to balance the machine, a drag bar support movable downwardly, drag bars carried at their forward ends by the support, means for suspending the drag bars from the frame in rear of their connection with the support, connections between the drag bar support and wheel spindles to cause the latter to move rearwardly as the support is depressed, and means for depressing the support.

3. In a cultivator, the combination of the main frame, a drag bar support mounted on the main frame and movable about a horizontal transverse axis, drag bars connected at their forward ends to said support, suspending devices sustained at their upper ends by the main frame and connected at their lower ends to said drag bars respectively and between the ends of the drag bars, means for adjusting said suspending devices independently to correspondingly adjust the drag bars and vary the depth of penetration of the cultivating appliances, and means for shifting the drag bar support about its axis; whereby the drag bars may be raised in unison at their rear ends to elevate the cultivating appliances, or said drag bars may be adjusted vertically independently of each other.

4. In a cultivator, the combination of the main frame, an arched axle member mounted therein and movable around a horizontal transverse axis, brackets connected with the extremities of the axle member, a transverse drag bar support connected with said brackets, drag bars carried by the support, and means for depressing the support.

5. In a cultivator, the combination of the main frame, an arched axle member mounted therein, and rotatable on a horizontal transverse axis, brackets mounted on the extremities of the axle member and movable on vertical axes, ground wheels carried by the brackets, a transverse drag bar support pivotally connected with the brackets on vertical axes, drag bars carried by the support, means for depressing the support; whereby the axle member will be rocked rearwardly, and means for shifting the support transversely; whereby the ground wheels will be turned laterally.

6. In a cultivator, the combination of a frame, ground wheel spindles shiftable back and forth with reference thereto, a plurality of drag bars, two distinct movable supports connecting said guide bars with the frame, one of said supports pivotally engaging the drag bars at intermediate points thereof, and the other support pivotally connected with the forward ends of the drag bars, means for raising said intermediate support, whereby the bars will be rocked on their forward support, means for depressing said forward support, whereby the bars will be rocked on their intermediate support, and connections between the forward support and the ground wheel spindles; whereby on the depression of the forward support, the drag bars will be elevated at their rear ends and simultaneously the ground wheels will be shifted to the rear.

7. In a cultivator, the combination of a supporting frame, a swinging axle frame fulcrumed therein, ground wheel spindles mounted on said swinging frame below the fulcrum thereof, a drag bar support located above and forward of said spindles and sustained by said swinging axle frame, whereby a downward movement of said support will be accompanied by a corresponding rearward movement of said spindles, drag bars pivoted to said support, means for depressing said support, and an adjustable suspension device for connecting the free ends of said bars with said supporting frame.

In testimony whereof I hereunto set my hand this 30th day of June, 1909, in the presence of two attesting witnesses.

ALEXUS C. LINDGREN.

Witnesses:
L. C. BLANDING,
W. V. RICHARDS.